(12) United States Patent
Kang

(10) Patent No.: US 7,576,808 B2
(45) Date of Patent: Aug. 18, 2009

(54) MULTI MODEL GLASS TYPE SUBSTRATE FOR LIQUID CRYSTAL DISPLAY DEVICE AND METHOD OF FABRICATING THE SAME

(75) Inventor: Sung-Gu Kang, Gyeongju-si (KR)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 11/289,450

(22) Filed: Nov. 30, 2005

(65) Prior Publication Data

US 2006/0119777 A1    Jun. 8, 2006

(30) Foreign Application Priority Data

Dec. 2, 2004  (KR) ............... 10-2004-0100362

(51) Int. Cl.
*G02F 1/136* (2006.01)
*G02F 1/1343* (2006.01)
(52) U.S. Cl. .................................... 349/43; 349/139
(58) Field of Classification Search ............ 349/139, 349/43
See application file for complete search history.

(56) References Cited

U.S. PATENT DOCUMENTS 6,081,308 A * 6/2000 Jeong et al. ............ 349/42
2003/0231277 A1* 12/2003 Zhang ..................... 349/187

FOREIGN PATENT DOCUMENTS

JP        9-325328      12/1997

* cited by examiner

*Primary Examiner*—James A Dudek
(74) *Attorney, Agent, or Firm*—McKenna Long & Aldridge

(57) ABSTRACT

A liquid crystal display device includes a first array cell having a first active region and a first pad region in a periphery of the first active region, wherein the first array cell includes a first gate line including first and second metal layers, a first data line crossing the first gate line to define a pixel region, a first switching device being near a crossing of the first gate line and the first data line and connected to the first gate line and the first data line, a first pixel electrode connected to the first switching device, a first gate pad electrode in the first pad region, a first gate link line extending from the first gate pad electrode and connected to the first gate line using a connection pattern; and a second array cell larger than the first array cell.

20 Claims, 17 Drawing Sheets

MULTI MODEL GLASS TYPE SUBSTRATE FOR LIQUID CRYSTAL DISPLAY DEVICE AND METHOD OF FABRICATING THE SAME

This application claims the benefit of Korean Patent Applications No. 10-2004-0100362, filed on Dec. 2, 2004, which is hereby incorporated by reference for all purposes as if fully set forth herein.

BACKGROUND OF THE INVENTION

1. Field of the Invention

The present invention relates to a substrate, and more particularly to a multi model glass (MMG) type substrate and a method of fabricating the same.

2. Discussion of the Related Art

Flat panel display (FPD) devices having light weight, thin profile, and low power consumption characteristics are being developed. Liquid crystal display (LCD) devices may be categorized as non-emissive display devices and are commonly used in notebook and desktop computers because of their high resolution, capability of displaying colored images, and high quality image display.

The LCD panel includes two substrates facing and spaced apart from each other. A liquid crystal material is interposed between the two substrates. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes. Transmittance of the LCD panel is thus changed according to polarization properties of the liquid crystal material.

An active matrix (AM) LCD including a thin film transistor as a switching device and a pixel electrode connected to the thin film transistor has recently been developed. The thin film transistor and the pixel electrode are arranged in a matrix. The AM LCD has been given the most attention of the flat panel displays because the AM LCD has a good resolution and an ability to display a moving picture.

FIG. 1 is a schematic perspective view of an LCD device according to the related art.

As shown in FIG. 1, an LCD device 1 includes an upper substrate 5, a lower substrate 21 facing the upper substrate 5, and a liquid crystal layer 40 interposed between the upper and lower substrates 5 and 21. A color filter layer 10 is formed on the upper substrate 5, a black matrix 7 is formed on the color filter layer 10, and a common electrode 15 is formed on the black matrix 7. Color filter layer 10 includes red (R), green (G) and blue (B) color filter elements.

A gate line 24 and a data line 30 crossing the gate line 24 define a pixel region P. The gate line 24 and the data line 30 are formed on the lower substrate 21. A thin film transistor Tr is disposed near a crossing of the gate and data lines 24 and 30, and a pixel electrode 35 is connected to the thin film transistor Tr in the pixel region P.

In addition, the LCD device 1 includes a gate pad electrode 25 connected to the gate line 24 and a data pad electrode 35 connected to the data line 30. The gate pad electrode 25 and the data pad electrode 35 are disposed in a gate pad region GPA and a data pad region DPA in a periphery region of an active region AA, respectively. Furthermore, a printed circuit board (PCB) may be connected to the gate and the data pad electrodes 25 and 35 in the gate and the data pad regions GPA and DPA. The LCD device 1 may further include a backlight unit having a plurality of optical sheets and a lamp (not shown).

A fabricating method of the LCD device 1 includes forming an array element including the thin film transistor Tr and the pixel electrode 35 connected to the thin film transistor Tr on the upper substrate 5, forming a color filter element including the black matrix 7, the color filter layer 10 and the common electrode 15 on the lower substrate 21, attaching the upper and the lower substrates 5 and 21, and interposing the liquid crystal layer 40 between the upper and the lower substrates 5 and 21.

A first substrate including a plurality of array cells is prepared and a second substrate including a plurality of color filter cells is prepared. In the attaching process, each of the array cells and each of the color filter cells face each other, and one of the array cell and one of the color filter cell have a seal pattern. The attached first and second substrates may be referred as a mother panel. The mother panel is scribed by cells. Accordingly, the interposing process is performed with respect to respective cells and the LCD panel is completed by sealing an opening portion of the seal pattern of each of the cells.

To increase the utility of the substrates, cells having various sizes may be included in the substrate. A main model cell having a relative big size in a main region and a sub model cell having a relative small size in a periphery region of the main region may be utilized for cellular phones or Personal Digital Assistants (PDA). The main model cell and the sub model cell are defined on the substrates to thereby increase productivity. The periphery region may be considered a dummy region in view of the main region, and the sub model cell is defined in the periphery region. Therefore, the utility of the substrates can be increased compared to the utility of the related art.

The substrate having the various size cells may be referred to as a multi model glass (MMG) type substrate, wherein the main model cell includes a gate line, a gate link line and a gate pad electrode. The gate line, the gate link line, and the gate pad electrode may be formed of aluminum (Al). The sub model cell includes a gate line, a gate link line and a gate pad electrode formed of a same material as that of the gate line, the gate link line, and the gate pad electrode of the main model cell.

However, when a gate pattern including a gate line, a gate link line and a gate pad electrode is formed to include the same materials in both the main model cell and the sub model cell, the gate pattern in the main model cell is performed by a module process within a short period of time. Therefore, corrosion does not occur in the main model cell because the gate pad electrode is not exposed under atmosphere within a short period of time. However, the gate pad electrode of the sub model cell is exposed for a long period of time under atmosphere because it is delivered in a panel state before performing the module process. As a result, corrosion severely occurs in the sub model cell. Corrosion occurs in the gate pad region between the gate pad electrode and a gate pad electrode terminal. The gate pad electrode terminal may be formed of ITO.

BRIEF SUMMARY OF THE INVENTION

Accordingly, the present invention is directed to a liquid crystal display device and a method of fabricating the same that substantially obviates one or more of the problems due to limitations and disadvantages of the related art.

An advantage of the present invention is to provide a MMG type substrate that can improve productivity and increase a utility factor of the substrate.

Another advantage of the present invention is to provide a method of fabricating a MMG type substrate that can improve productivity and increase the utility of the substrate.

Another advantage of the present invention is to provide a MMG type substrate that can improve image quality by preventing a signal delay.

Another advantage of the present invention is to provide a method of fabricating a MMG type substrate that can improve image quality by preventing a signal delay.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display device includes a first array cell having a first active region and a first pad region in a periphery of the first active region, wherein the first array cell includes a first gate line including a first metal layer and a second metal layer, the first metal layer closer to a substrate than the second metal layer, a first data line crossing the first gate line to define a pixel region, the first data line being formed of a third metal layer having a same chemical property as the second metal layer, a first switching device connected to the first gate line and the first data line, and being near a crossing of the first gate line and the first data line, a first pixel electrode connected to the first switching device, a first gate pad electrode including the third metal layer in the first pad region, and a first gate link line extending from the first gate pad electrode and connected to the first gate line using a connection pattern formed of a same material as the first pixel electrode; and a second array cell larger than the first array cell.

In another aspect of the present invention, a method of fabricating a liquid crystal display device includes forming a first array cell having a first active region and a first pad region in a periphery of the first active region, wherein forming the first array cell includes forming a first gate line with a first metal layer and a second metal layer, the first metal layer closer to a substrate than the second metal layer, forming a first data line crossing the first gate line to define a pixel region, the first data line being formed of a third metal layer having a same chemical property as the second metal layer, forming a first switching device connected to the first gate line and the first data line and being near a crossing of the first gate line and the first data line, forming a first pixel electrode connected to the first switching device, forming a first gate pad electrode including the third metal layer in the first pad region, and forming a first gate link line extending from the first gate pad electrode and connected to the first gate line using a connection pattern formed of a same material as the first pixel electrode; and forming a second array cell larger than the first array cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to embodiments of the present invention, examples of which are illustrated in the accompanying drawings. Wherever possible, the same reference numbers will be used throughout the drawings to refer to the same or similar parts.

Figure 1:
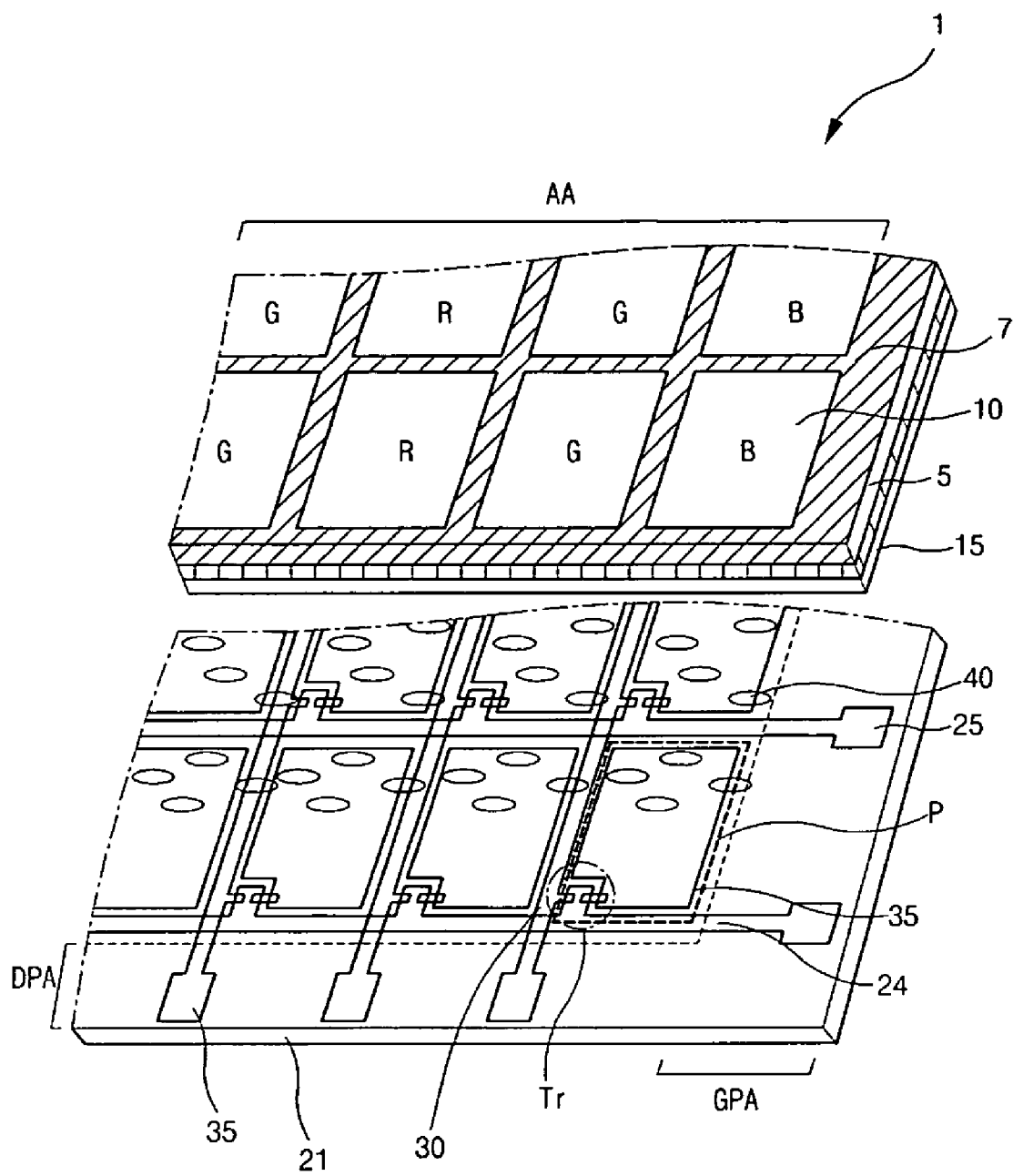
FIG. 1 is a schematic perspective view of an LCD device according to the related art.
Figure 2:
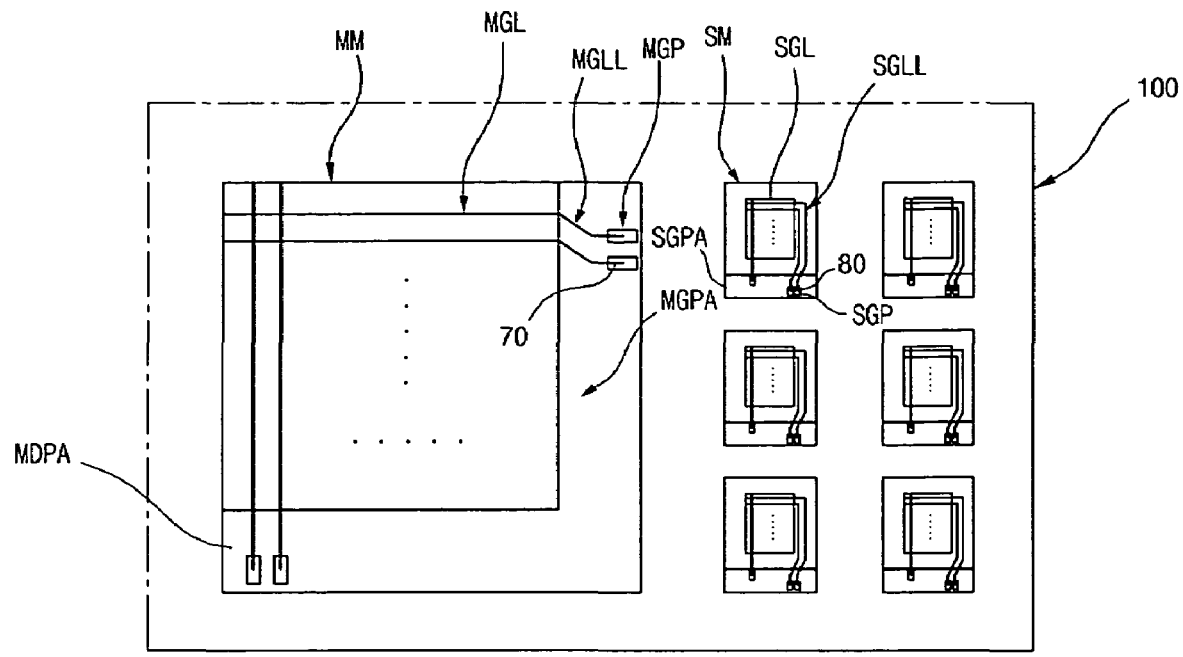
FIG. 2 is a schematic plan view showing a substrate for an LCD device according to a first embodiment of the present invention.
Figure 3:
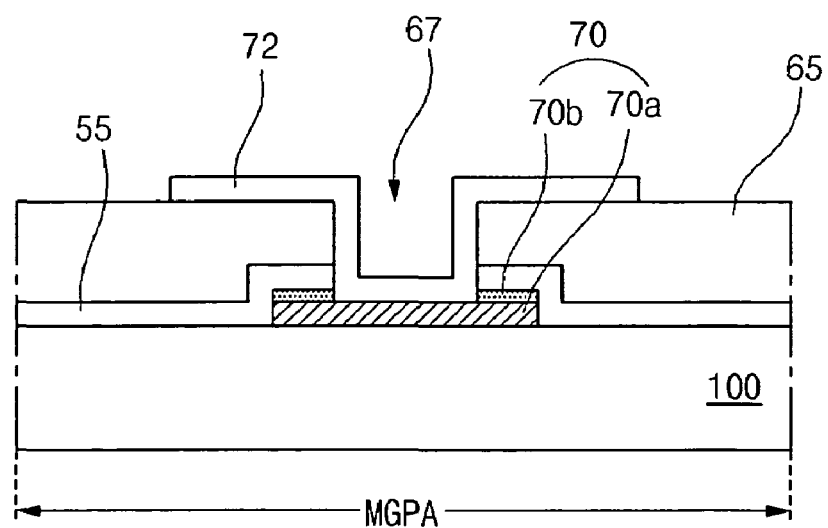
FIG. 3 is an illustration of a gate pad region of a first array cell of FIG. 2.
Figure 4:
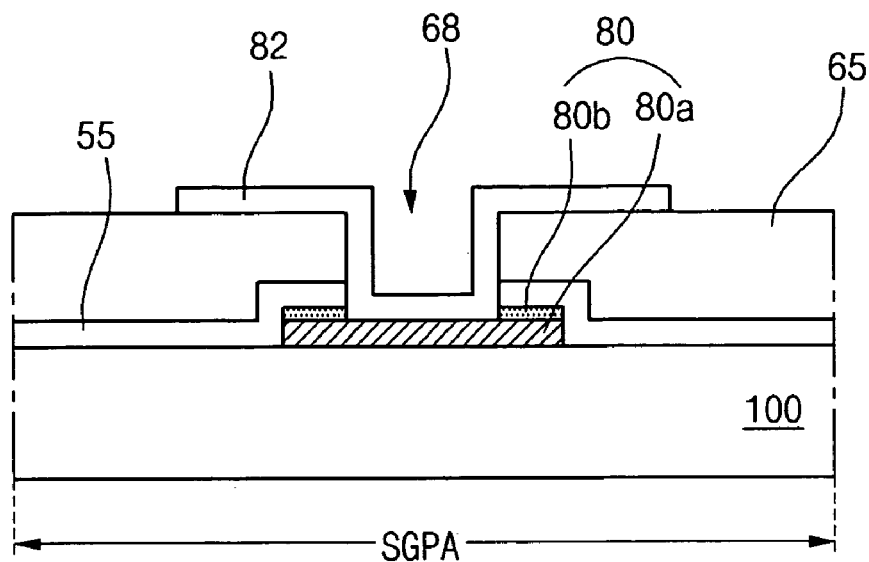
FIG. 4 is an illustration of a gate pad region of a second array cell of FIG. 2.

FIG. 2 is a schematic plan view showing a substrate for an LCD device according to a first embodiment of the present invention, FIG. 3 is a gate pad region of a first array cell of FIG. 2, and FIG. 4 is a gate pad region of a second array cell of FIG. 2.

As shown in FIGS. 2 to 4, the first array cell MM includes a first gate line MGL, a first gate link line MGLL connected to the first gate line MGL, and a first gate pad electrode 70 connected to the first gate link line MGLL. The first gate line MGL, the first gate link line MGLL, and the first gate pad electrode 70 may include a first metal layer 70a formed of a metal material, such as aluminum (Al) or Al alloy. The first gate line MGL, the first gate link line MGLL, and the first gate pad electrode 70 may also include a second metal layer 70b made of a metal material, such as molybdenum (Mo). In other words, the first gate line MGL, the first gate link line MGLL, and the first gate pad electrode 70 may be formed as a double-layered metal structure, wherein the first metal layer 70a is closer to the substrate 100 than the second metal layer 70b. FIG. 2 also shows a data pad region MDPA, a gate pad MGP of a first array cell and a gate pad SGP of a second array cell.

Furthermore, a first gate pad electrode terminal 72 is connected to the first gate pad electrode 70 and may include a transparent conductive material such as indium tin oxide (ITO) or indium zinc oxide (IZO).

The first gate pad electrode terminal 72 is connected to the first gate pad electrode 70 via a first pad contact hole 67. The first pad contact hole 67 is formed in a gate insulating layer 55 on the first gate pad electrode 70 and in a passivation layer 65 formed on the gate insulating layer 55. The first gate pad electrode terminal 72 may be connected to a side portion of the second metal layer 70b of the first gate pad electrode 70 and to a center portion of the first metal layer 70a of the first gate pad electrode 70.

Al alloy does not resist corrosion well and has a low resistance. Mo resists corrosion well and has a high resistance compared to Al. Accordingly, because the first gate line MGL, the first gate link line MGLL, and the first gate pad electrode 70 may be formed as a double-layered metal structure having a top layer of Mo, the corrosion in the first gate pad region (not shown) can be prevented even though the first gate pad region is exposed to the atmosphere.

In addition, a second array cell SM includes a second gate line SGL, which may be formed of the same material as the first gate line MGL. The second array cell SM also includes a second gate link line SGLL, which may be formed of the same material as the first gate link line MGLL, and a second pad electrode 80, which may be made of the same material as the first pad electrode 70.

For example, the second gate pad electrode 80 includes a first metal layer 80a, which may be formed of AlNd and a second metal layer 80b, which may be formed of Mo. Thus, the materials of the first metal layer 80a and the second metal layer 80b may be similar to the materials of the first metal layer 70a and the second metal layer 70b of the first gate pad electrode 70. A second gate pad electrode terminal 82 is connected to the first gate pad electrode 80 via a second pad contact hole 68. The second pad contact hole 68 is formed in the gate insulating layer 55 and in the passivation layer 65.

The substrate 100 referred as a multi model glass (MMG) type substrate for the LCD device according to the present invention may solve corrosion problems by forming the first and the second gate patterns such as the gate line, the gate link line, and the gate pad electrode as s double-layered metal structure including a top metal layer, which may be formed of Mo or any metallic material that has a strong resistance to corrosion.

Figure 5:
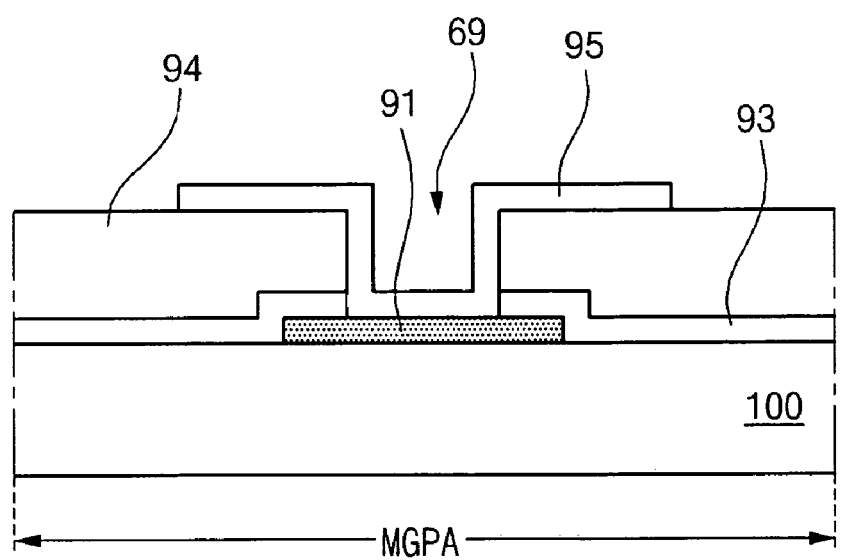
FIG. 5 is a schematic cross sectional view showing a first gate pad region of a first array cell of FIG. 2.
Figure 6:
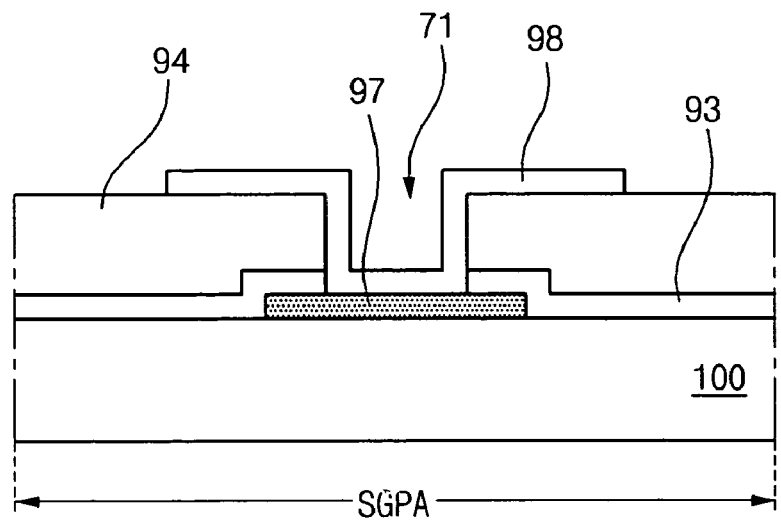
FIG. 6 is a schematic cross sectional view showing a second gate pad region of a second array cell of FIG. 2 according to a second embodiment of the present invention.

FIG. 5 is a schematic cross sectional view showing a first gate pad region MGPA of a first array cell of FIG. 2 and FIG. 6 is a schematic cross sectional view showing a second gate pad region SGPA of a second array cell of FIG. 2 according to a second embodiment of the present invention.

As shown in FIG. 5, a first gate pad electrode 91 may be formed as a single metal layer of Mo having a thickness within a range within about 2,500 to 3,000 angstroms (Å). The first gate link line MGLL may be connected to the first gate pad electrode 91 and the first gate line MGL may be connected to the first gate link line MGLL. The first gate link line MGLL and the first gate line MGL may be formed with the same material as the first gate pad electrode 91.

The first gate pad electrode 91 may be formed of Mo, which has a strong resistance to corrosion. The first gate pad electrode 91 is not required to have Al or Al alloy.

In the first embodiment, the second metal layer 70b (of FIG. 3) or 80b (of FIG. 4) may be formed of Mo with a thin thickness, so that the second metal layer 70b or 80b is removed by forming a first pad contact hole 67 (of FIG. 3) that exposes the first gate pad electrode 70 (of FIG. 3). Therefore, the first gate pad electrode terminal 72 (of FIG. 3) contacts the side portion of the second metal layer 70b of the first gate pad electrode 70. As a result, when the first gate pad electrode terminal 72 is connected to the first gate pad electrode 70 via the first pad contact hole 67, the atmosphere with $O_2$ may be undesirably infiltrated therein.

Accordingly, the substrate 100 of the second embodiment includes the first gate pad electrode 91 which may be made of a single metal layer of Mo that has a thickness range within about 2,500 to about 3,000 angstroms. Because the single metal layer of Mo has a strong resistance to corrosion, corrosion may be prevented even though a first pad electrode terminal 95 and the first gate pad electrode 91 are connected to each other via a first pad contact hole 69. The first pad contact hole 69 is formed in a gate insulating layer 93 on the first gate pad electrode 91 and in a passivation layer 94 on the gate insulating layer 93.

As shown in FIG. 6, the second array cell SM includes a second gate pad electrode 97, which may be formed of a same material and configuration as the first gate pad electrode 91 (of FIG. 5). Similarly, a second gate link line (not shown) connected to the second gate pad electrode 97 and a second gate line (not shown) connected to the second gate link line may be formed with a same material and configuration as the first gate link line (not shown) and the first gate line (not shown). The second gate pad electrode 97 is connected to a gate pad electrode terminal 98 via a second pad contact hole 71 formed in the gate insulating layer 93 and the passivation layer 94.

Figure 7:
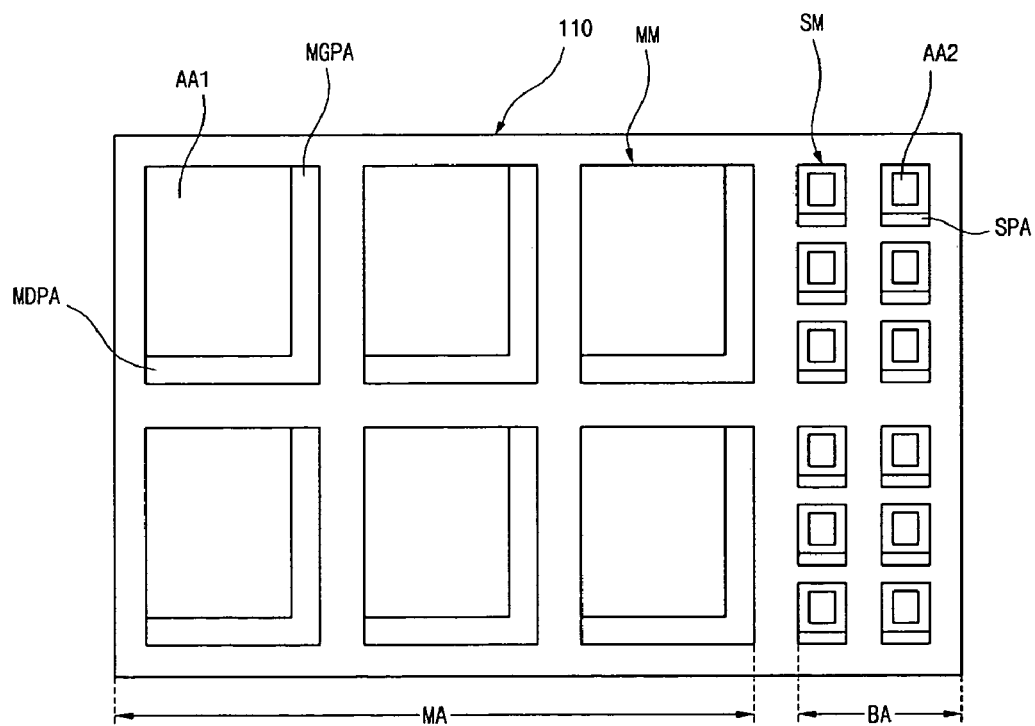
FIG. 7 is a schematic plan view showing a substrate for an LCD according to the present invention.
Figure 8:
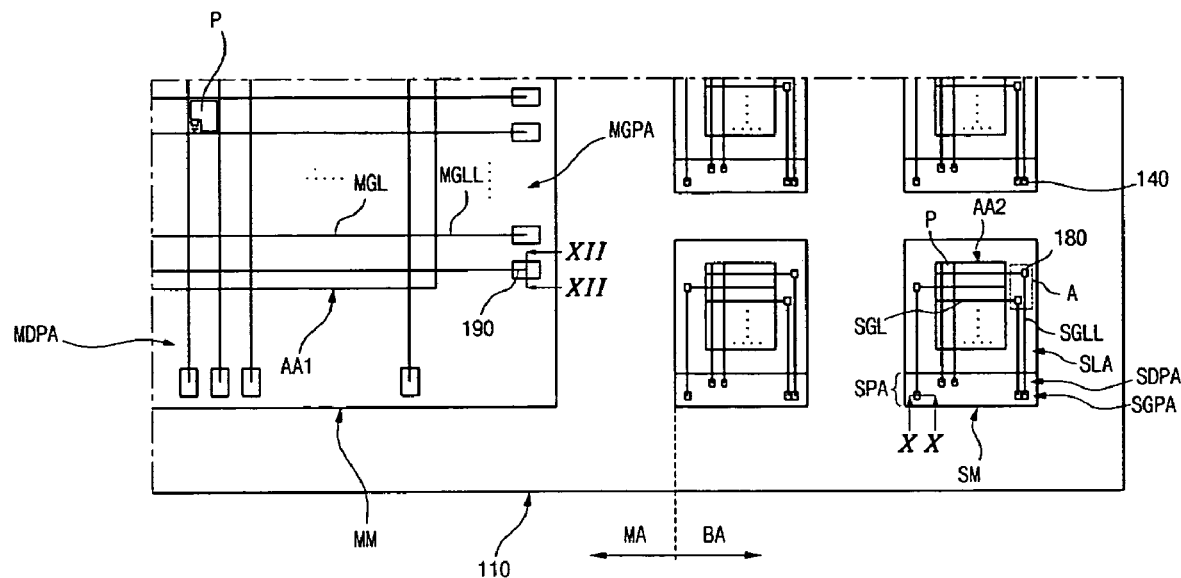
FIG. 8 is an expanded plan view of FIG. 7.

FIG. 7 is a schematic plan view showing a substrate for an LCD according to the present invention. FIG. 8 is an expanded plan view of FIG. 7, and FIG. 9 is an expanded plan view of "A" area of FIG. 8 according to a third embodiment of the present invention.

Figure 9:
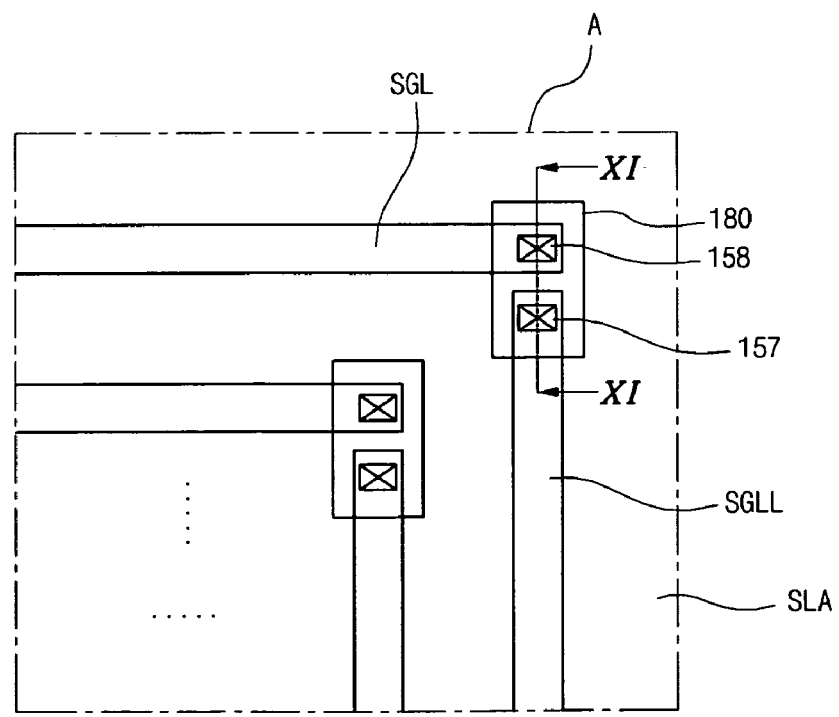
FIG. 9 is an expanded plan view of "A" area of FIG. 8 according to a third embodiment of the present invention.
Figure 10:
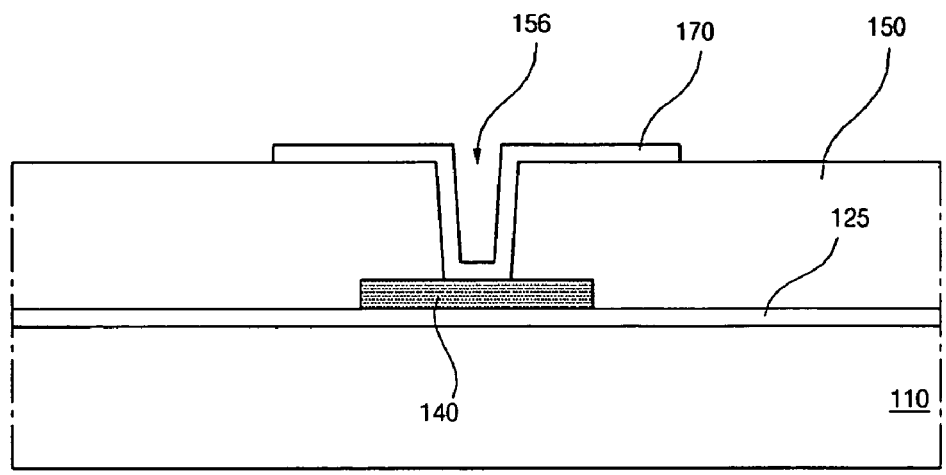
FIG. 10 is a schematic cross sectional view showing a second gate pad region taken along a line X-X of FIG. 8.
Figure 11:
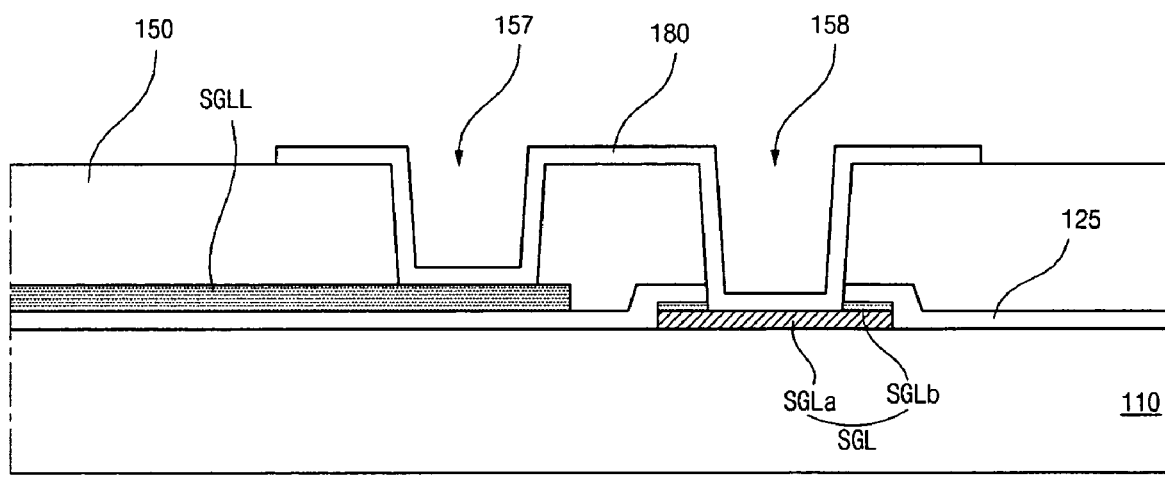
FIG. 11 is a schematic cross sectional view showing a second gate link region taken along a line XI-XI of FIG. 9.
Figure 12:
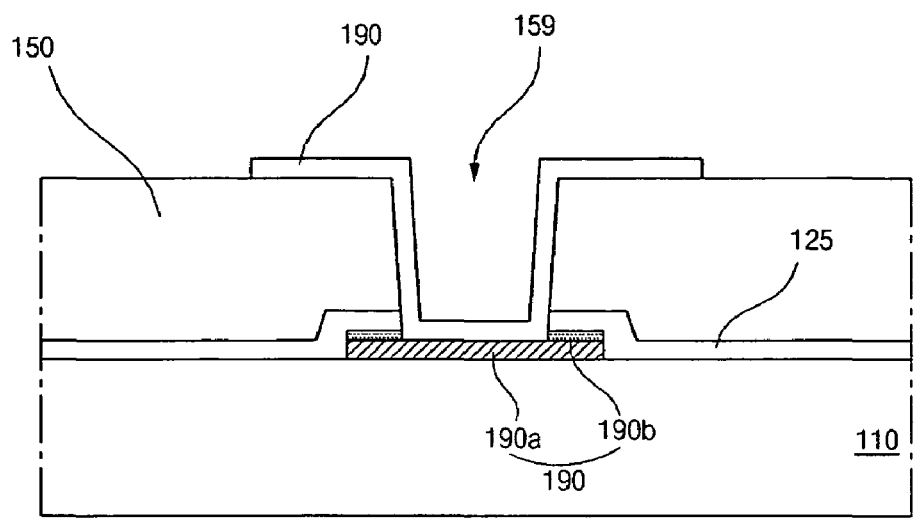
FIG. 12 is a schematic cross sectional view showing a second gate pad region taken along a line XII-XII of FIG. 8 according to the third embodiment of the present invention.

FIG. 10 is a schematic cross sectional view showing a second gate pad region taken along a line X-X of FIG. 8, FIG. 11 is a schematic cross sectional view showing a second gate link region taken along a line XI-XI of FIG. 9, and FIG. 12 is a schematic cross sectional view showing a second gate pad region taken along a line XII-XII of FIG. 8 according to the third embodiment of the present invention.

As shown in FIG. 7, a substrate 110 includes a plurality of first array cells MM and a plurality of second array cells SM, wherein the first array cell MM is larger than the second array cell SM, and wherein the plurality of the first array cells MM are disposed in the main region MA of the substrate 110 and the plurality of the second array cells SM are disposed in a periphery region BA of the main region MA. The first array cell MM may be referred as a main model array cell, the second array cell SM may be referred as a sub model array cell, and the substrate 110 may be referred as a multi model glass (MMG). Pixel regions P are defined.

A first gate pad region MGPA and a first data pad region MDPA of the first array cell MM are independently defined. However, the second gate pad region SGPA and the second data pad region SDPA of the second array cell SM are defined in the same second pad region SPA. In addition, a second link region SLA is defined in right and left portions of a second active region AA2 of the second array cell SM, respectively.

Furthermore, a first gate line MGL in the first active region AA1, a first gate link line MGLL and a first gate pad electrode 190 in the first gate pad region MGPA may be formed with the same material as each other. A second gate line SGL, having portions SGLa and SGLb, in a second active region AA2 may be formed with the same material as the first gate line MGL. A second gate link line SGLL and a second gate pad electrode 140 in a second gate pad region SGPA are formed with a different material from the second gate line SGL and include a metallic material having a strong resistance to corrosion. The second gate pad electrode 140 is connected to a second gate pad electrode terminal 170 via a second pad contact hole 156 in a gate insulating layer 125 and a passivation layer 150.

A second gate line SGL is connected to the second gate link line SGLL via a first link contact hole 158 and a second link contact hole 157 in the second gate pad region SGPA using a connection pattern 180. The second gate line SGL is connected to one edge of the connection pattern 180 via the first link contact hole 158, and the second gate link line SGLL is connected to the connection pattern 180 via the second link contact hole 157. The first link contact hole 158 and the second link contact hole 157 are formed in the gate insulating layer 125 and the passivation layer 150.

For example, the first gate patterns such as the first gate line MGL, the first gate link line MGLL, and the first gate pad electrode 190 include a first metal layer as a bottom layer and a second metal layer as a top layer. The first metal layer may be formed with aluminum neodymium (AlNd) having a thickness range within about 2,000 to about 2,500 angstroms. Furthermore, the second metal layer may be formed with Mo having a thickness range within about 400 to about 600 angstroms on the first metal layer.

The first gate pad electrode 190, having portions 190a and 190b, is connected to a first gate pad electrode terminal via a second pad contact hole 159 in the gate insulating layer 125 and the passivation layer 150.

Alternately, the second gate patterns such as the second gate link line SGLL and the second gate pad electrode 140 may be formed as a single metal layer having a strong resistance to corrosion. For example, the second gate pattern may be formed with Mo having a thickness range within about 2,000 to about 3,000 angstroms.

Accordingly, the second gate pattern is formed of a metallic material having a strong resistance to corrosion and the second array cell SM is exposed under the atmosphere for a long time. Therefore, corrosion is effectively prevented in the second array cell SM because a corrosion ratio of the second array cell SM may be significantly reduced.

A method of fabricating a substrate for an LCD device according to the present invention will be explained in detail as follows.

FIGS. 13A to 13E are schematic cross sectional views showing a method of fabricating array elements in a pixel region of a second array cell for an LCD according to the present invention. FIGS. 14A to 14E are schematic cross sectional views showing a method of fabricating array elements in a second pad region of a second array cell for an LCD according to the present invention. FIGS. 15A to 15E are schematic cross sectional views showing a method of fabricating array elements in a second link region of a second array cell for an LCD according to the present invention. FIGS. 16A to 16E are schematic cross sectional views showing a method of fabricating array elements in a first pad region of a first array cell for an LCD according to the third embodiment of the present invention.

As shown in FIGS. 13A, 14A, 15A, and 16A, a first metal layer 120a, SGLa and 190a is respectively formed on a substrate 110 by depositing a first metallic material having a low resistance such as an Al alloy AlNd having a thickness range within about 2,000 to 2,500 angstroms. Then, a second metal layer 120b, SGLb and 190b is respectively formed on the first metal layer 120a, SGLa or 190a by depositing a second metallic material having a strong resistance to corrosion such as Mo having a thickness range within about 400 to 600 angstroms. Alternatively, Al instead of AlNd may be utilized as the first metallic material with a thickness range within about 2,000 to 2,500 angstroms and Mo may be utilized as the second metallic material with a thickness range within about 400 to 600 angstroms. That is, an Al/Mo configuration may be utilized instead of an AlNd/Mo configuration.

A photoresist material layer (not shown) is coated on an entire surface of the second metal layer 120b, SGLb and 190b, and is then exposed using a mask (not shown) having a transmissive portion and a shielded portion to form a photoresist pattern. Therefore, the first metal layer 120a, SGLa or 190a and the second metal layer 120b, SGLb or 190b are patterned into a second gate line SGL and a second gate electrode 120 connected to the second gate line SGL in the second array cell SM using the photoresist pattern as a mask. A second link line and a second pad electrode are not yet formed. In addition, the first metal layer 190a and the second metal layer 190b in a first pad region (not shown) are patterned into a first gate pad electrode 190.

As shown in FIGS. 13B, 14B, 15B, and 16B, a gate insulating layer 125 may be formed by depositing an inorganic insulating material on an entire surface of the first gate line (not shown) and the second gate line SGL.

Next, as shown in FIGS. 13A to 13E, a second active layer 127a and a second ohmic contact layer 127b are sequentially formed by depositing an intrinsic amorphous silicon material and a doped amorphous silicon on the gate insulating layer 125 using a mask process that includes depositing a photoresist material, exposing the photoresist material using a mask, and developing and etching the exposed photoresist material. The second active layer 127a and the second ohmic contact layer 127b constitute a semiconductor layer 127.

Figure 13A:
FIGS. 13A to 13E are schematic cross sectional views showing a method of fabricating array elements in a pixel region of a second array cell for an LCD according to the present invention.
Figure 13B:
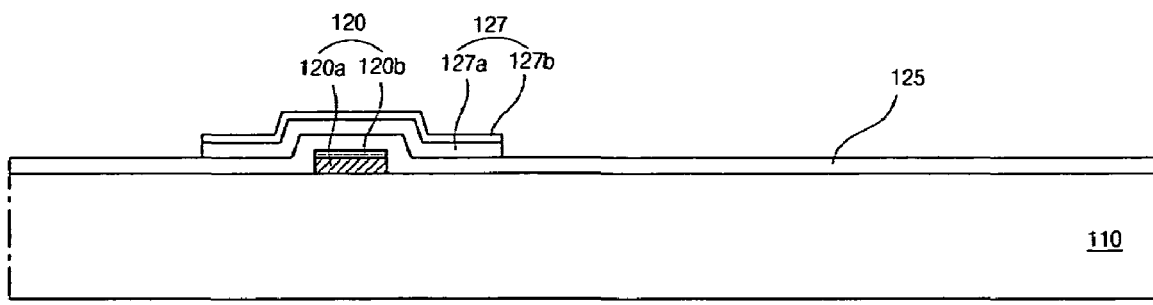
Figure 13C:
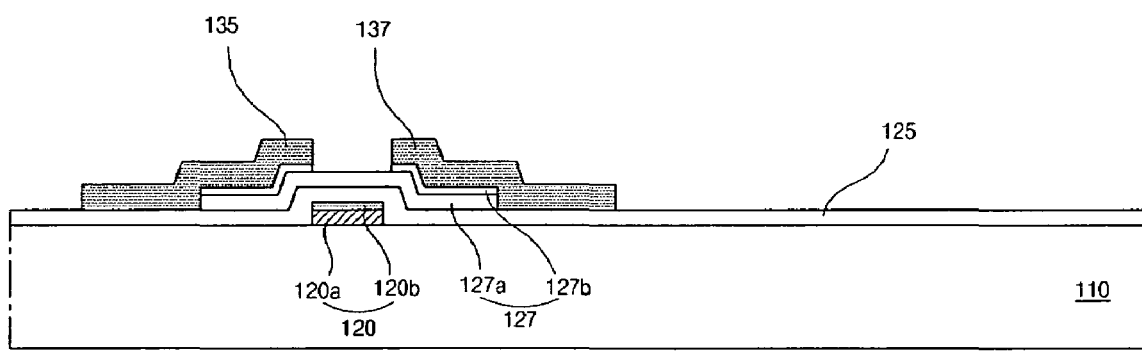

As shown in FIG. 13C, a third metal layer (not shown) may be formed by depositing a metallic material having a strong resistance to corrosion such as Mo with as a thickness range within about 2,000 to 3,000 angstroms on the semiconductor layer 127. Then, by using another mask process, the third metal layer may be patterned into a second data line (not shown) crossing the second gate line SGL shown in FIGS. 15A to 15E.

Figure 13D:
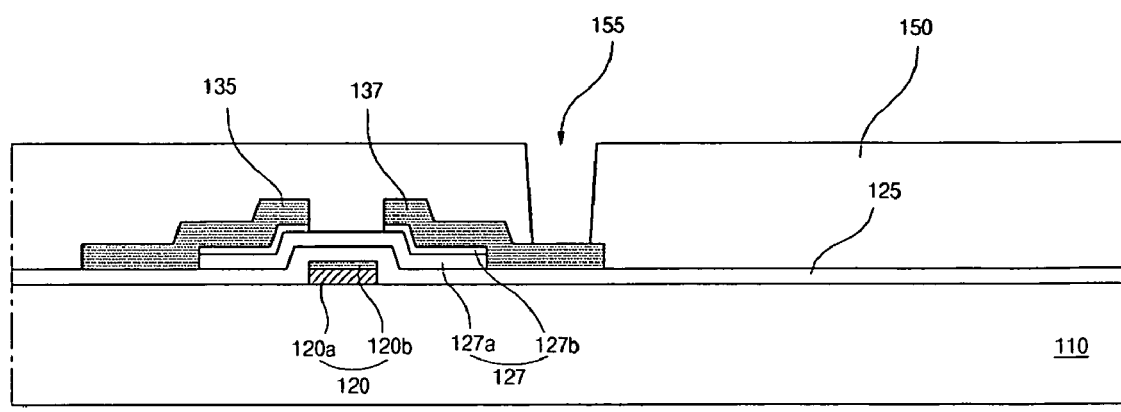
Figure 13E:
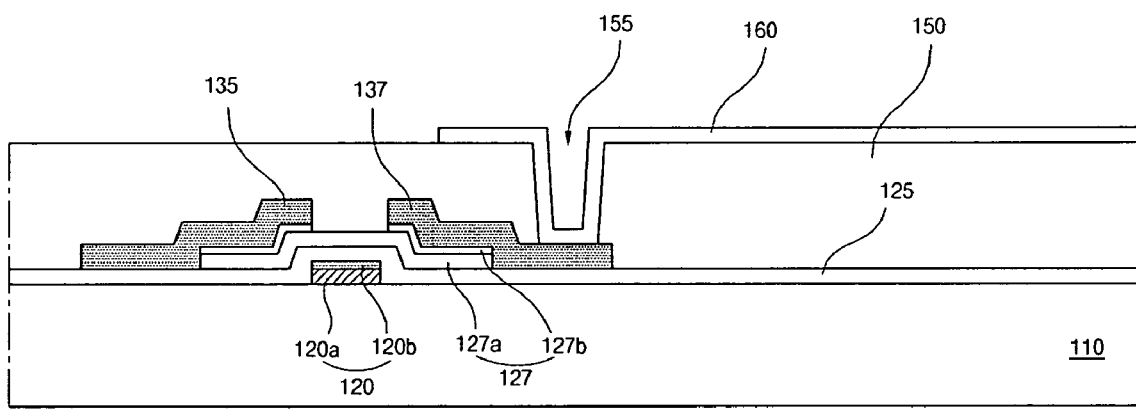

Then, as shown in FIGS. 13C to 13E, a second source electrode 135 connected to the second data line and a second drain electrode 137 spaced apart from the second source electrode 135 may be formed on the semiconductor layer 127. Next, as shown in FIGS. 13D and 13E, an exposed portion of the second ohmic contact layer 127b is etched to expose a portion of the second active layer 127a corresponding to the exposed portion of the second ohmic contact layer 127b. The exposed portion of the second active layer 127a may be defined as a channel region (not shown). In this step, a second gate link line SGLL, shown in FIGS. 15C to 15E, and a second gate pad electrode 140, shown in FIGS. 14C to 14E, may be formed with a same material as the second data line, the second source electrode 135 and the second drain electrode 137.

As shown in FIGS. 13D, 14D, 15D, and 16D, a passivation layer 150 may be formed by depositing or coating an inorganic insulating material or an organic material on an entire surface of the first and the second data lines, the second gate link line SGLL and the second gate pad electrode 140.

Then, as shown in FIGS. 13D and 13E, a drain contact hole 155 exposing a portion of the second drain electrode 137 is formed. A first pad contact hole 159, shown in FIGS. 16D to 16E, and a second pad contact hole 156, shown in FIGS. 14D and 14E, exposing portions of the first and the second gate pad electrodes 190 and 140, respectively, are formed. A third pad contact hole (not shown) and a fourth pad contact hole (not shown) exposing portions of the first and the second data pad electrodes, respectively, are formed.

Figure 15A:
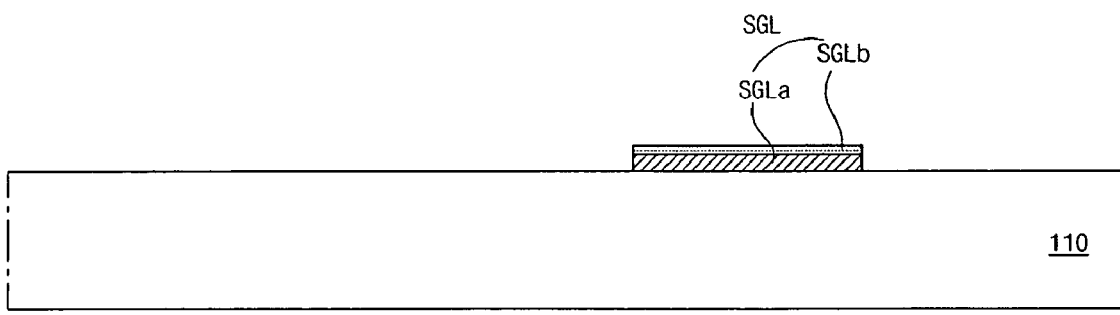
FIGS. 15A to 15E are schematic cross sectional views showing a method of fabricating array elements in a second link region of a second array cell for an LCD according to the present invention.
Figure 15B:
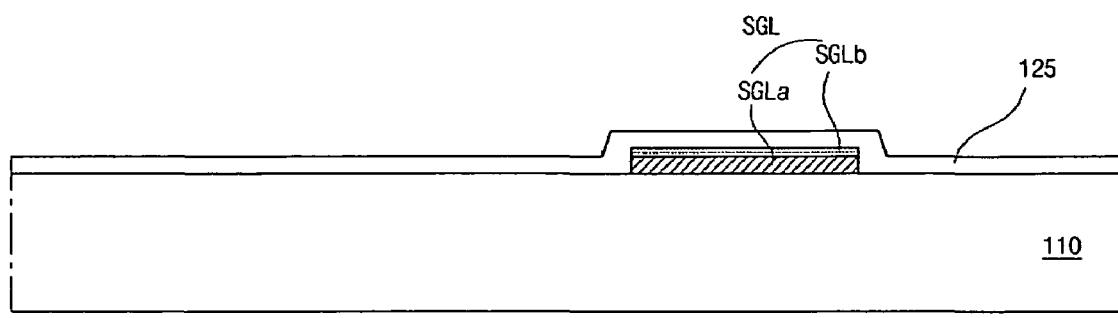
Figure 15C:
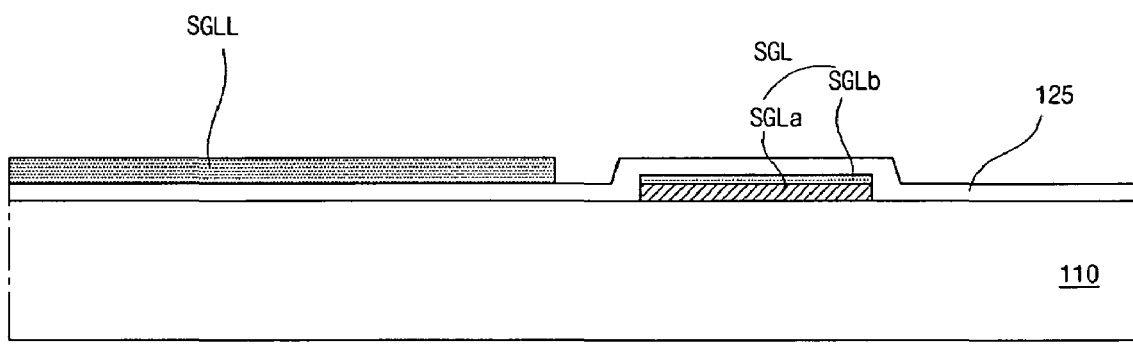
Figure 15D:
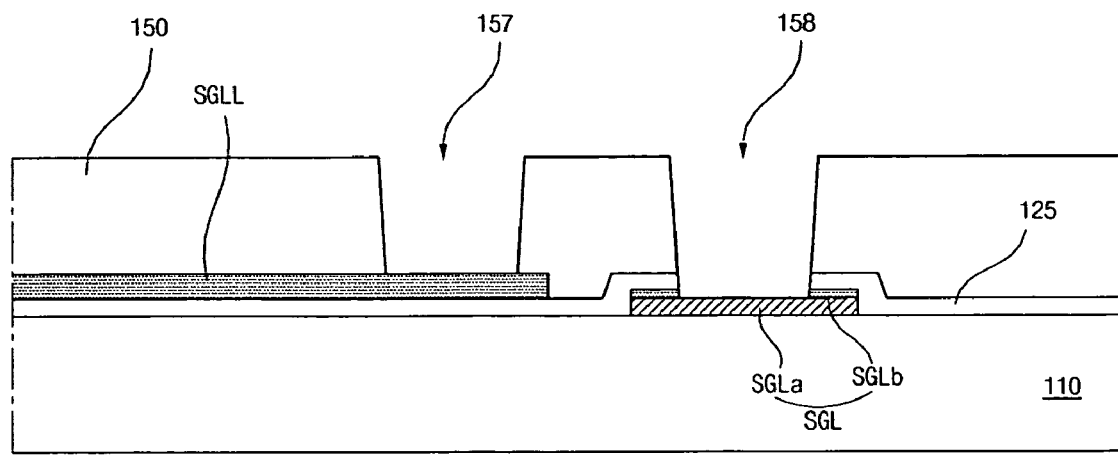
Figure 15E:
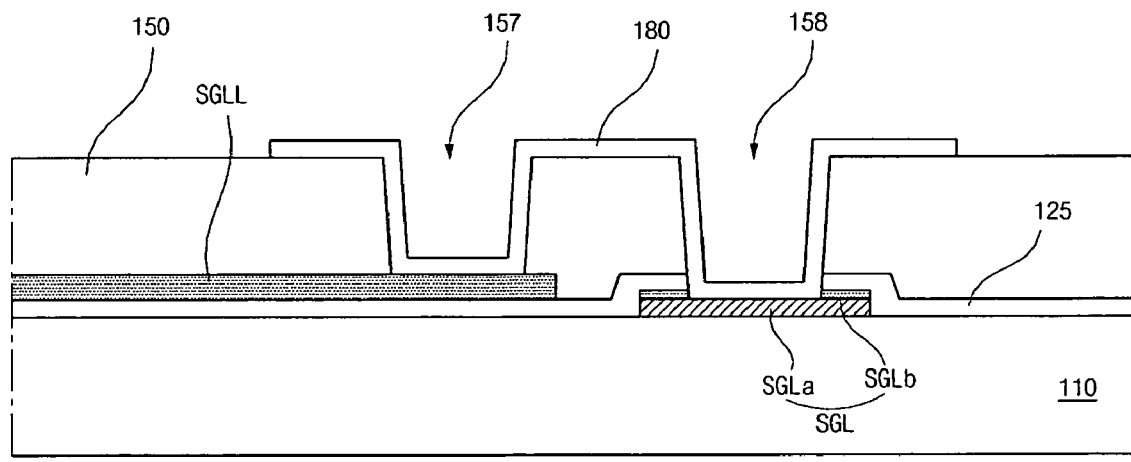
Figure 16A:
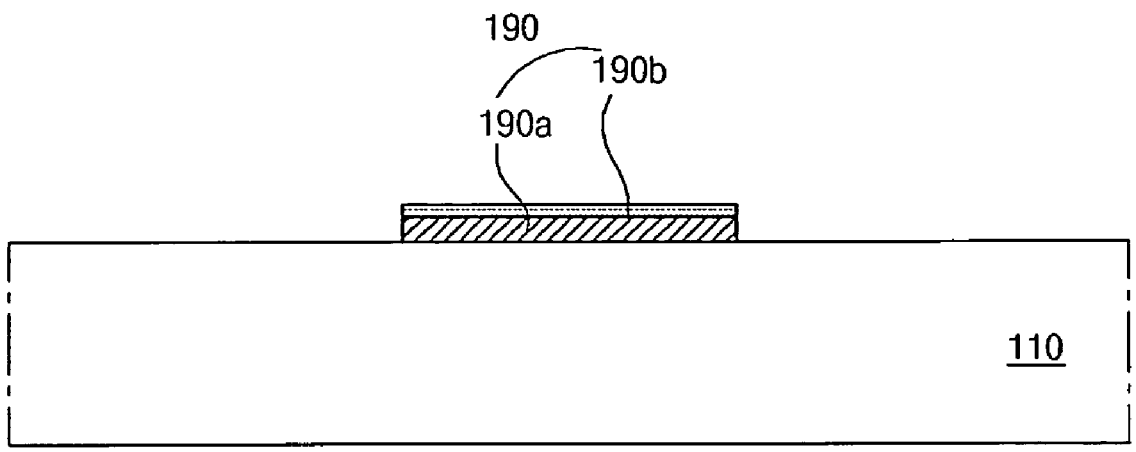
FIGS. 16A to 16E are schematic cross sectional views showing a method of fabricating array elements in a first pad region of a first array cell for an LCD according to the present invention.
Figure 16B:
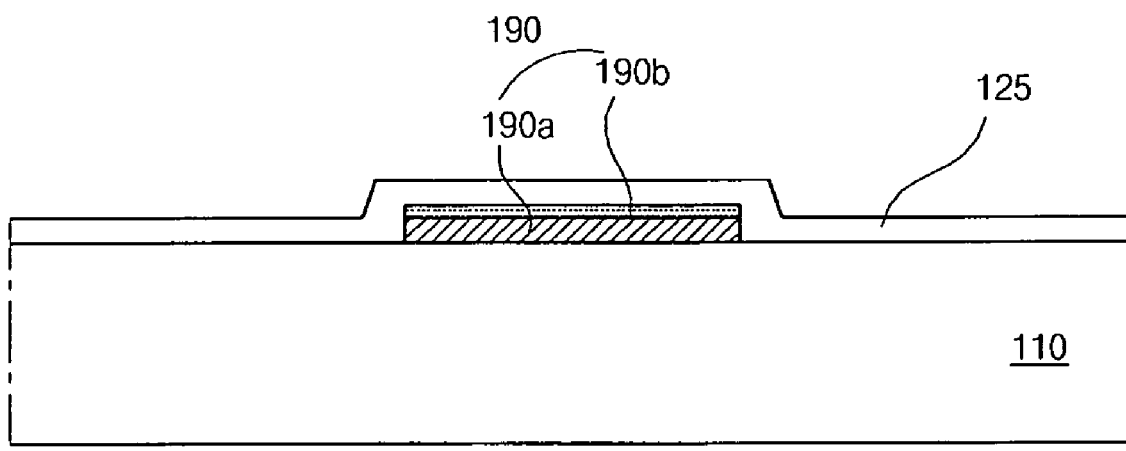
Figure 16C:
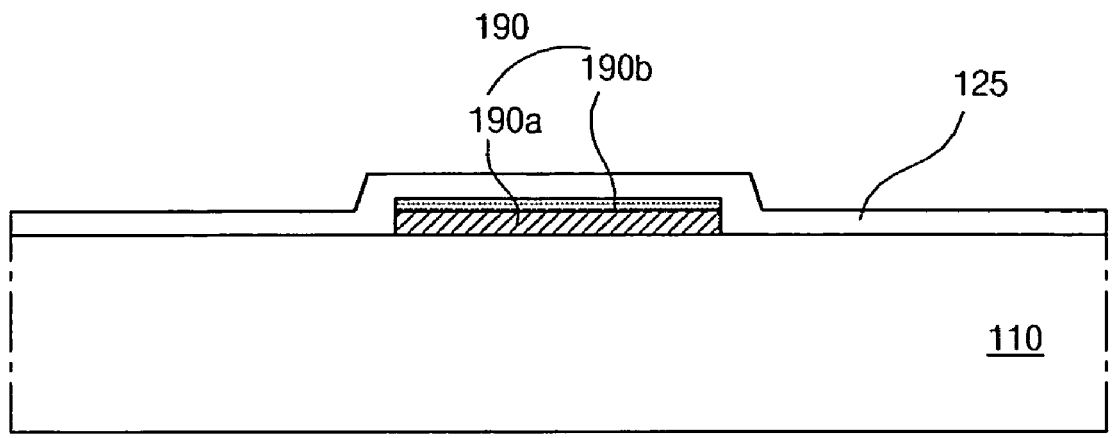
Figure 16D:
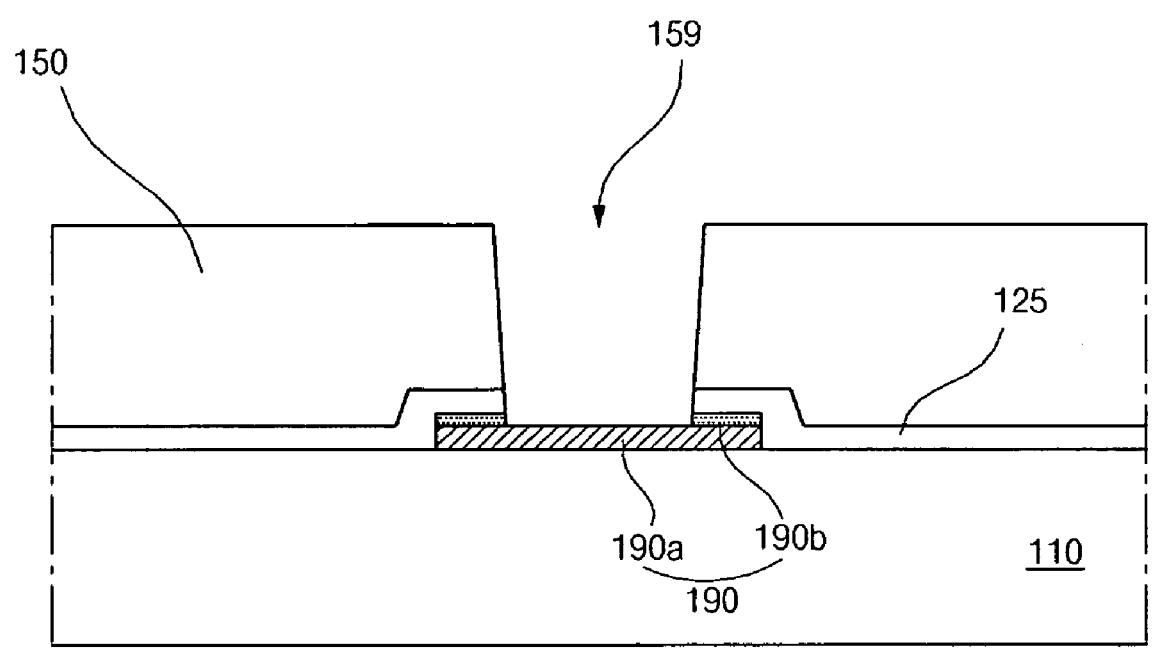
Figure 16E:
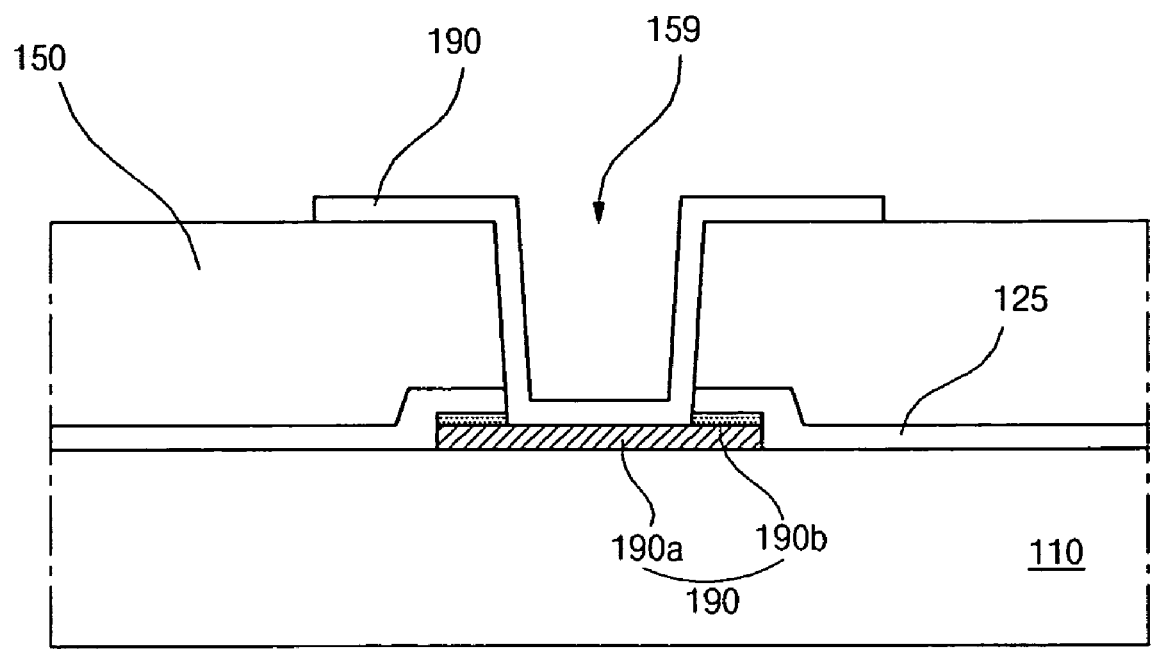

A first link contact hole 158, shown in FIGS. 15D to 15E, may be formed to expose an edge of the second gate line SGL. A second link contact hole 157, shown in FIGS. 15D to 15E, may be formed to expose an edge of the second gate link line SGLL. The first link contact hole 158 may be formed by etching the gate insulating layer 125 as well as the passivation layer 150. Similarly, the first pad contact hole 159, shown in FIGS. 16D to 16E, may be formed by etching the gate insulating layer 125 as well as the passivation layer 150. As shown in FIGS. 16A to 16E, because the second metal layer 190b of the first gate pad electrode 190 is partially etched, the first metal layer 190a of the first gate pad electrode 190 below the second metal layer 190b is exposed or the second metal layer 190b is formed to be thinner.

As shown in FIG. 13E, a second pixel electrode 160 is formed by depositing a transparent conductive material such as ITO and IZO in the second array cell SM. A first pixel electrode (not shown) may be connected to the first drain electrode via the first drain contact hole. Similarly, the second pixel electrode 160 is connected to the second drain electrode 137 via the second drain contact hole 155.

Simultaneously, a first gate pad electrode terminal is formed on the passivation layer 150 to overlap the first gate pad electrode 190 and is connected to the first gate pad electrode 190 via the first pad contact hole 159. A second gate pad electrode terminal 170, shown in FIG. 14E, is connected to the second gate pad electrode 140 via a second pad contact hole 156 in the passivation layer 150.

Figure 14A:
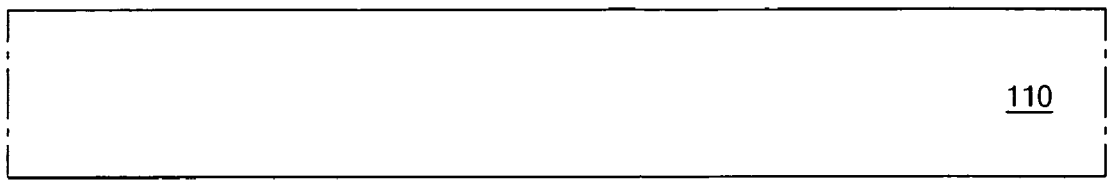
FIGS. 14A to 14E are schematic cross sectional views showing a method of fabricating array elements in a second pad region of a second array cell for an LCD according to the present invention.
Figure 14B:
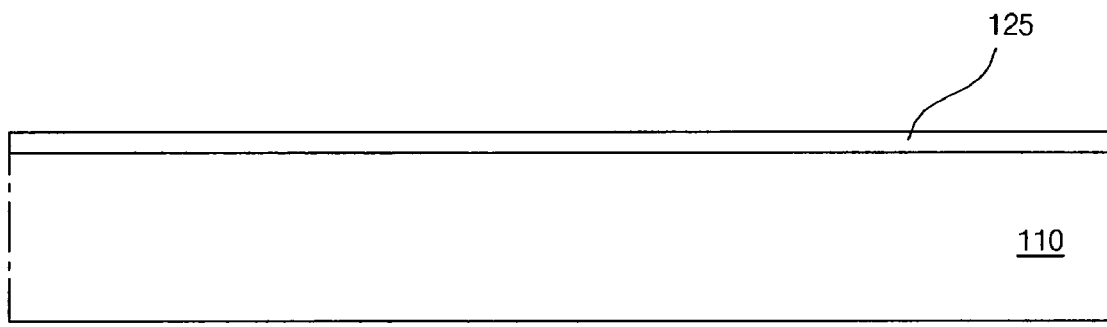
Figure 14C:
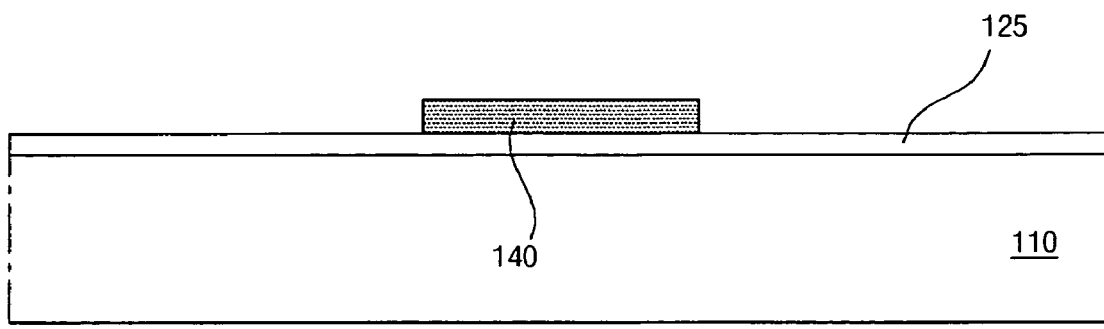
Figure 14D:
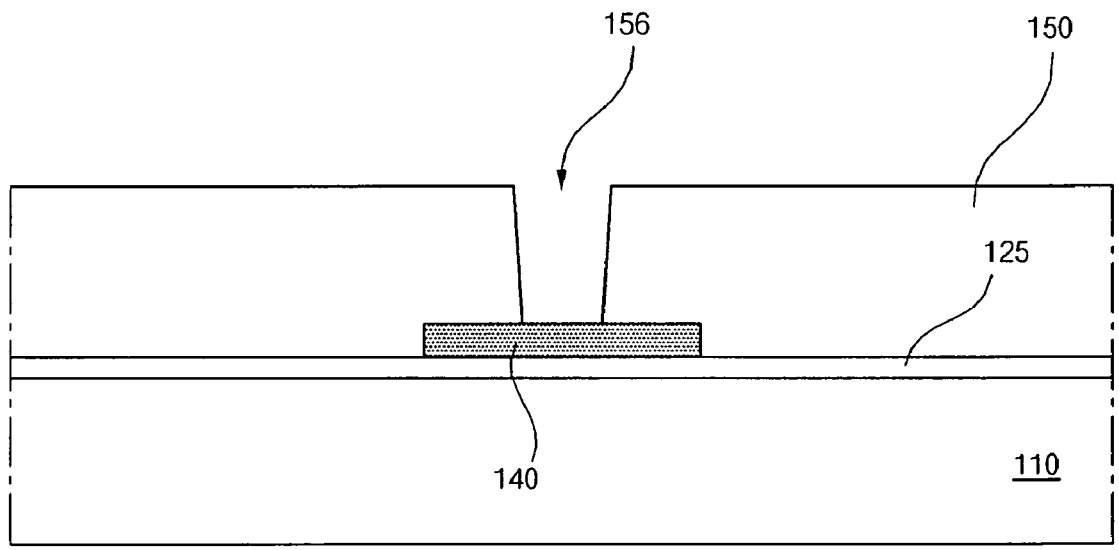
Figure 14E:
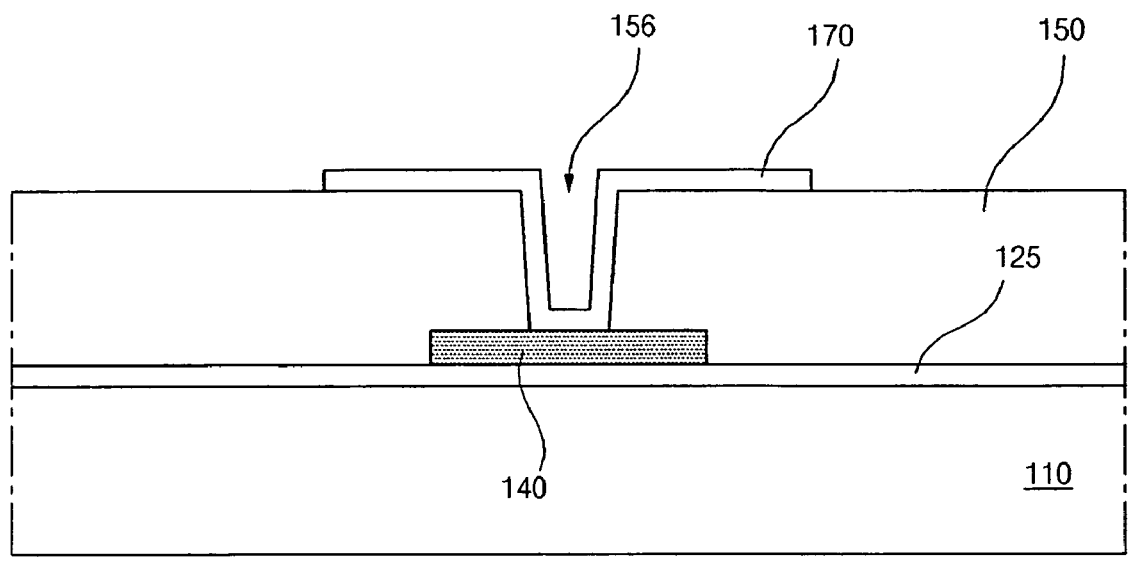

The second gate pad electrode 140, shown in FIGS. 14C to 14E, is connected to the second gate line SGL using the second gate link line SGLL, shown in FIGS. 15C to 15E. In addition, the second gate line SGL and the second gate link line SGLL are connected to each other using the connection pattern 180, shown in FIG. 15E, of the same material as the second gate pad electrode terminal 170.

As shown in FIGS. 15D to 15E, the second gate line SGL may be connected to one edge of the connection pattern 180 via the first link contact hole 158, and the second gate link line SGLL is connected to the connection pattern 180 via the second link contact hole 157. The first link contact hole 158 and the second link contact hole 157 are formed in the gate insulating layer 125 and the passivation layer 150. Accordingly, the second gate line SGL and the second gate link line SGLL are connected to each other through the connection pattern 180. The MMG type array substrate completed by the mentioned method is attached an opposite MMG type color filter substrate having a first color filter cell corresponding to the first array cell and a second color filter cell corresponding to the second array cell. A liquid crystal material is then interposed between the array substrate and the color filter substrate. Then, the attached substrates are scribed. Thus, a LCD device according to the present invention is completed by a continuous fabricating process.

The LCD process may be modified and changed by various methods. The LCD cell process will be explained in detail as follows.

A first alignment layer and a second alignment layer are formed by coating a polymer material such as polyimide on a first substrate and a second substrate, respectively. Next, the first alignment layer and the second alignment layer are rubbed to arrange a polymer chain in the first and the second alignment layers. Alternatively, irradiating light or ion beam on the alignment layers may replace the rubbing process to thereby arrange the polymer chain.

Then, spreading a spacer for maintaining a cell gap and coating a silver (Ag) dot are performed on one of the first substrate and the second substrate. A seal pattern is formed on the other of the first substrate and the second substrate. For example, a liquid crystal material is dispensed on one of the first substrate and the second substrate. Spreading the spacer may be omitted if a patterned spacer is formed on one of the first substrate and the second substrate. Furthermore, coating the Ag dot may be omitted when a pixel electrode and a common electrode are all formed on one substrate such as in an In Plane Switching (IPS) mode LCD.

Then, the array substrate and the color filter substrate are positioned to face the first alignment layer and the second alignment layer. The array substrate and the color filter substrate are arranged to accurately coincide with the array patterns and the color filter patterns. The array substrate and the color filter substrate are then attached.

When a vacuum condition is changed into atmosphere, the dispensed liquid crystal material spreads over an active region.

Then, the MMG type LCD panel is completed by curing the seal pattern, using for example ultra violet (UV) irradiation. The UV light irradiates the entire surface of the substrate or a portion of the substrate corresponding to the seal pattern.

Next, the MMG type panel is scribed to divide the panel into a plurality of LCD panels.

Finally, an LCD module process is performed with respect to the LCD panel corresponding to the first array cell and the first color filter cell, so a printed circuit board connecting the respective pads and a backlight unit having a plurality of optical sheets and a lamp is assembled with the LCD panel, thereby obtaining a complete LCD device.

The MMG type substrate for the LCD device according to the present invention includes a sub model cell that has a small size such as a size less than 3 inches. The gate line in the sub model cell is formed of a metallic material having a low resistance different from that of a main mode cell. The gate link line and the gate pad electrode are formed of a metallic material having a strong resistance to corrosion when the data line is formed. Furthermore, a connection pattern connecting the gate line and the gate link line in the sub mode cell is formed with a same material as the pixel electrode such as ITO and IZO. Therefore, the MMG type substrate may be fabricated so that corrosion may be effectively prevented without additional processing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi model glass type substrate for a liquid crystal display device, comprising:
   a first array cell having a first active region and a first pad region in a periphery of the first active region,
   wherein the first array cell includes a first gate line including a first metal layer and a second metal layer, the first metal layer closer to a substrate than the second metal layer, a first data line crossing the first gate line to define a pixel region, the first data line being formed of a third metal layer having a same chemical property as the second metal layer, a first switching device connected to the first gate line and the first data line, and being near a crossing of the first gate line and the first data line, a first pixel electrode connected to the first switching device, a first gate pad electrode having a single layer of the third metal layer in the first pad region, a first gate link line extending from the first gate pad electrode and connected to the first gate line using a connection pattern formed of a same material as the first pixel electrode, and an insulating layer on the first gate line and under the first gate pad electrode and the first gate link line; and
   a second array cell larger than spaced apart from the first array cell along one of the first gate line and the first data line,
   wherein a material of the third metal layer is different than a material of the first metal layer.

2. The substrate according to claim 1, wherein the first metal layer includes one of aluminum (Al) and aluminum alloy.

3. The substrate according to claim 1, wherein at least one of the second metal layer and the third metal layer includes molybdenum (Mo).

4. The substrate according to claim 1, wherein the second array cell includes a second active region and a second pad region in a periphery of the second active region, a second gate line including the first metal layer and the second metal layer, a second gate link line and a second gate pad electrode formed of a same material as the second gate line, a second data line crossing the second gate line and including the third metal layer, and a second switching device connected to the second gate line and the second data line, and being near a crossing of the second gate line and the second data line.

5. The substrate according to claim 1, further comprising a first data link line extending from the first data line and a first data pad electrode extended from the first data link line, wherein the first data link line and the first data pad electrode are disposed in the first pad region with the first gate link line and the first gate pad electrode.

6. The substrate according to claim 1, wherein the insulating layer includes a first link contact hole connecting the first gate line and one edge of the connection pattern and a second link contact hole connecting the first gate link line and another edge of the connection pattern.

7. The substrate according to claim 6, wherein the insulating layer further includes a first pad contact hole connecting the first gate pad electrode and a first gate pad electrode terminal.

8. The substrate according to claim 1, wherein the first pixel electrode includes one of indium tin oxide (ITO) and indium zinc oxide (IZO).

9. A method of fabricating a multi model glass type substrate for a liquid crystal display device, comprising:
   forming a first array cell having a first active region and a first pad region in a periphery of the first active region,
   wherein forming the first array cell includes forming a first gate line with a first metal layer and a second metal layer, the first metal layer closer to a substrate than the second metal layer, forming a first data line crossing the first gate line to define a pixel region, the first data line being formed of a third metal layer having a same chemical property as the second metal layer, forming a first switching device connected to the first gate line and the first data line, and being near a crossing of the first gate line and the first data line, forming a first pixel electrode connected to the first switching device, forming a first gate pad electrode having a single layer of the third metal layer in the first pad region, forming a first gate link line extending from the first gate pad electrode and connected to the first gate line using a connection pattern formed of a same material as the first pixel electrode, and forming an insulating layer on the first gate line and under the first gate pad electrode and the first gate link line; and
   forming a second array cell larger than and spaced apart from the first array cell along one of the first gate line and the first data line,
   wherein a material of the third metal layer is different than a material of the first metal layer.

10. The method according to claim 9, wherein forming the second array cell includes:
   forming a second gate line, a second gate link line, and a second gate pad electrode with the first metal layer and the second metal layer, wherein the second gate line, the second gate link line, and the second gate pad electrode form one body;
   forming a second data line crossing the second gate line and including the third metal layer; and
   forming a second switching device connected to the second gate line and the second data line and being near a crossing of the second gate line and the second data line.

11. The method according to claim 9, wherein the insulating layer includes a first link contact hole connecting the first gate line and one edge of the connection pattern and a second link contact hole connecting the first gate link line and another edge of the connection pattern.

12. The method according to claim 11, wherein the insulating layer further includes a first pad contact hole connecting the first gate pad electrode and a first gate pad electrode terminal.

13. The method according to claim 9, wherein forming the first switching device includes:
   forming a first gate electrode connected to the first gate line;
   forming a first source electrode connected to the first data line and a first drain electrode spaced apart from the first source electrode;
   forming a first data link line extended from the first data line; and
   forming a first data pad electrode extended from the first data link line.

14. The method according to claim 13, further comprising forming a first data pad electrode terminal connected to the first data pad electrode, wherein the first data pad electrode includes one of indium tin oxide (ITO) and indium zinc oxide (IZO).

15. The method according to claim 13, wherein the first data link line and the first data pad electrode are disposed in the first pad region with the first gate link line and the first gate pad electrode.

16. The method according to claim 9, wherein the first metal layer includes one of aluminum (Al) and aluminum alloy.

17. The method according to claim 9, wherein at least one of the second metal layer and the third metal layer includes molybdenum (Mo).

18. The method according to claim 9, wherein forming the second array cell includes forming a second active region and a second pad region in a periphery of the second active region.

19. The method according to claim 10, wherein forming the second array cell includes forming a second active region and a second pad region in a periphery of the second active region.

20. The method according to claim 9, wherein the first pixel electrode includes one of indium tin oxide (ITO) and indium zinc oxide (IZO).

* * * * *